United States Patent Office 3,346,573
Patented Oct. 10, 1967

3,346,573
PROCESS FOR AMINOALKYLATION OF PHENO-
THIAZINE AND DERIVATIVES THEREOF
Imre L. Fabricius, Herlev, Denmark, assignor to Novo
Terapeutisk Laboratorium A/S, Copenhagen N, Denmark, a Danish joint-stock company
No Drawing. Filed Aug. 24, 1965, Ser. No. 482,255
Claims priority, application Denmark, July 21, 1961, 3,012/61, Patent 98,062; Sept. 20, 1961, 3,732/61, Patent 98,063; Nov. 15, 1961, 4,553/61, Patent 95,419; July 2, 1962, 2,957/62
3 Claims. (Cl. 260—243)

This is a continuation-in-part of application Ser. No. 210,821, filed July 18, 1962, now abandoned.

The term aminoalkylation refers to the introduction of the radical $$\begin{matrix} R^1 \\ \phantom{R^1} \diagdown \\ \phantom{R^1} \phantom{\diagdown} N-A- \\ \phantom{R^1} \diagup \\ R^2 \end{matrix}$$

in which $R^1$ and $R^2$ are alkyl groups while A represents a straight or branched alkylene radical.

Aminoalkylation of simple aliphatic secondary amines can be carried out in many cases directly by treating the secondary amine with e.g. a halogen derivative of a dialkylaminoalkane.

However, in the aminoalkylation of secondary amines in which strong electron-attracting groups are linked to the nitrogen atom and which consequently have weak acidic properties, this simple method of aminoalkylation usually fails. As representatives of such weakly acidic amines mention should be made of diphenylamine and its nuclear substituted derivatives as well as a series of aromatic-heterocyclic secondary amines related to diphenylamine, in which the nitrogen atom is incorporated in the heterocyclic ring. N-alkylation of compounds of this type can be performed by converting by means of a strong base, such as lithium or sodium amide the secondary amine into the corresponding N-alkali metal derivative and subsequently reacting it with the alkylating agent in the form of a reactive ester of a dialkylaminoalkanol, e.g. the halide.

Among the compounds that can be prepared by means of the latter method, mention may be made of 10-dialkylaminoalkyl phenothiazine and its nuclear substituted derivatives. Several of these compounds have valuable therapeutic properties.

Thus, 10-(3'-dimethylaminopropyl)-phenothiazine can be produced by condensing the N-alkali metal compounds of phenothiazine and a reactive ester of 3-dimethylamino-1-propanol. Both of these reaction components are unstable and should be used immediately. The N-alkali metal compound is preferably prepared by means of a suspension of sodium amide in an inert medium, such as toluene or xylene. The process implies both the danger of fire and explosion. As a rule, 3-dimethylamino-1-chlorpropane is used as the reactive derivative of 3-dimethylamino-1-propanol. It is toxic and is prepared from the aminoalcohol and thionyl chloride which has a strongly irritating effect on the mucous membranes.

The object of the present invention is to provide a novel route for preparing aminoalkylated phenothiazine and aminoalkylated phenothiazine derivatives.

According to the present invention it has now been found that aminoalkylated phenothiazine and aminoalkylated phenothiazine and aminoalkylated phenothiazine derivatives may be produced in one step and in excellent yields by a new method. Moreover, the new method according to the invention makes the use of an inert reaction medium superfluous and the reaction components used are stable and easily accessible.

The main feature of the process of the invention comprises reacting with heating a phenothiazine represented by the formula:

<chemical structure: phenothiazine with substituent R> in which R is selected from the group consisting of hydrogen, chlorine, lower alkyl, fluoro-substituted lower alkyl, lower alkanoyl, and YR' in which Y is selected from the group consitsing of oxygen and sulphur, and R' is lower alkyl, with a carbonic acid ester of the formula $$O=C\begin{matrix}OR^3\\OR^4\end{matrix}$$

in which $R^3$ is represented by the formula $$A-N\begin{matrix}R^5\\R^5\end{matrix}$$

in which A is a primary alkylene having at least 2 carbon atoms in the principal chain and a total of up to 4 carbon atoms and in which the nitrogen atom is in one of the positions 2 and 3 of the alkylene chain, $$N\begin{matrix}R^5\\R^5\end{matrix}$$

is selected from the group consisting of di(lower alkyl) amino, pyrrolidino, piperidino, morpholino and N-alkylpiperazino, and $R^4$ is selecting from the group consisting of $$A-N\begin{matrix}R^5\\R^5\end{matrix}$$

as hereinbefore defined and lower alkyl, whereafter the resultant product which is represented by the formula:

<chemical structure: 10-substituted phenothiazine> is obtained.

As examples of lower alkyl groups within the definition of the above formulae there may be mentioned e.g. methyl, ethyl, n-propyl, i-propyl, n-butyl, i-butyl, pentyl, hexyl and the like. Among the lower alkanoyl groups falling within the definition of R there may be mentioned e.g. acetyl, propionyl, butyryl, valeryl and the like.

The primary alkylene group A may e.g. be

—CH$_2$—CH$_2$—,  —CH$_2$—CH$_2$—CH$_2$—,  —CH$_2$—CH—CH$_2$—
                                                    |
                                                    CH$_3$

—CH$_2$—CH—,  —CH—CH$_2$—  and  —CH$_2$—C(CH$_3$)$_2$—
       |              |
       CH$_3$         CH$_3$ As examples of suitable phenothiazine reactants for use in the process of the invention there may be mentioned e.g. phenothiazine, 2-chlorophenothiazine, 2-methylphenothiazine, 2-ethylphenothiazine, 2-propylphenothiazine, 2-butylphenothiazine, 2-pentylphenothiazine, 2-hexylphenothiazine, 2-trifluoromethylphenothiazine, 2-acetylphenothiazine, 2-propionylphenothiazine, 2-butyrylphenothiazine, 2-valerylphenothiazine, 2-methoxyphenothiazine, 2-ethoxyphenothiazine, 2-propoxyphenothiazine, 2-butoxyphenothiazine, 2-methylthiophenothiazine, 2-ethylthiophenothiazine, 2-propylthiophenothiazine and the like.

Among suitable carbonic acid esters to be used in the present process there may be mentioned e.g. bis(2-dimethylaminoethyl)carbonate, bis(3-dimethylaminopropyl) carbonate, as well as the mixed esters of carbonic acid with ethanol and 2-dimethylamino-1-ethanol, 2-dimethylamino-1-propanol, 3-dimethylamino-1-propanol, 3-dimethylamino-2-methylpropanol, 3-(4'-methyl-1'-piperazinyl)-1-propanol, 2-(N-morpholinyl)ethanol, 2-(N-piperidyl)-ethanol, 3-(N-pyrrolidyl)-1-propanol and the like, respectively.

The aminoalkylation method according to this invention is a new direct alkylation process which is not general for esters of carbonic acid. The method is specific for esters of carbonic acids with those aliphatic alcohols which carry a tertiary substituted amino group in position 2 or 3 of the hydrocarbon chain.

Theoretical, considerations as well as the fact that other aminoalkyl compounds are produced as by-products during the alkylation process seem to show that the aminoalkylation takes place through an activated intermediate step in which a cyclic onium compound is in equilibrium with a carbonium ion with which the secondary amine subsequently reacts under formation of the aminoalkylated final phenothiazine product.

The aminoalkylation described above is preferably performed in the presence of a basic catalyst. Examples thereof are alkali salts of weak acids, such as potassium carbonate, potassium acetate, or potassium phthalate.

According to a preferred embodiment of the process of the invention the reaction of the phenothiazine and the carbonic acid ester is carried out in the presence of a basic catalyst at a temperature within the range of 150° C. to 270° C.

In practice, it is preferred that the phenothiazine, which is to be aminoalkylated, is heated together with the basic catalyst to a temperature preferably in the range of 150–270° C., whereupon the carbonic acid ester is added dropwise over a suitable period of time.

The resultant N-aminoalkylated phenothiazines may be isolated in a manner known per se and are obtained in excellent yields. Since the process may be carried out without using any inert reaction medium, the production capacity per unit of reaction volume is exceptionally high.

Among the carbonic acid esters applicable as alkylating agents, the following can be mentioned as examples: asymmetric carbonic acid esters of 2-dimethylaminoethanol or 3-dimethylamino-1-propanol and ethanol as well as the corresponding symmetric carbonic acid esters of these aminoalcohols.

Practically quantitative yields of carbonic acid esters of the asymmetric type are obtained by reacting the corresponding aminoalcohol with an ester of chloroformic acid in the presence of an acid-binding agent, e.g. triethylamine. The symmetric esters of carbonic acid may be produced by transesterification between a dialkylcarbonate, e.g. diethylcarbonate, and the aminoalcohol in the presence of a basic catalyst.

Formation of the carbonic acid esters in situ is also possible in the following way:

A mixture of the phenothiazine, which is to be aminoalkylated, and an aminoalcohol of the following formula:

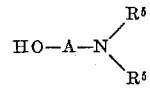

in which A and $R^5$ are as defined above, is reacted with a dialkyl carbonate, preferably in the presence of a basic catalyst of the type mentioned above, and preferably at a temperature within the range of 150° C. to 270° C. The molecular ratio of the phenothiazine to aminoalcohol and the dialkyl carbonate should be $$(0.8–1.2):(1.6–2.4):(3–5)$$

preferably 1:2:4. The process is best performed in the following manner:

A mixture of the phenothiazine and the aminoalcohol is heated, and the dialkylcarbonate is added subsequently. Addition of a basic compound, such as potassium carbonate or aluminium alcoholate, catalyzes the reaction. Alcohol together with surplus aminoalcohol and dialkylcarbonate are removed by distillation and the aminoalkylated phenothiazine is then isolated by commonly known methods.

The following examples further illustrate the new aminoalkylation process.

Example 1

2-chlorophenothiazine (58.5 g.) and potassium acetate (8 g.) are placed in a reaction flask equipped for distillation and immersed in an oil bath at 220–230° C. Bis(2-dimethylaminoethyl)carbonate (102 g.) (boiling point (15 mm.) 125–128° C.) is added dropwise, while stirring, in the course of 1–2 hours. After distillation has ceased the reaction mixture is kept at 230° C. for another 30 minutes and then cooled. When the residue is treated with hydrochloric acid a sparingly soluble hydrochloride separates. The hydrochloride is converted with excess sodium hydroxide into the free base. A solution of the free base in hydrochloric acid yields the crystalline hydrochloride of 2-chloro-10-(2'-dimethylaminoethyl)phenothiazine (60 g.) Recrystallized from chlorobenzene the compound has melting point 252–253° C.

Example 2

2-chlorophenothiazine (58.5 g.) and potassium acetate (8 g.) are placed in a reaction flask equipped for distillation and immersed in an oil bath at 220–230° C. Mixed ester (87.5 g.) of 3-dimethylamino-1-propanol and ethanol with carbonic acid is added dropwise with efficient stirring during 2 hours. At the same time 35–40 ml. of distillate is collected. The resulting reaction mixture is kept at 230° C. for another 30 minutes cooled to 200° C., and the distillation continued in vacuo (15 mm.) until distillation ceases.

The residue is cooled and extracted with hydrochloric acid. The acid solution is made alkaline with sodium hydroxide and the oil which separates is taken up into ether.

2-chloro-10-(3'-dimethylaminopropyl)phenothiazine (66 g.), boiling point (0.6 mm.) 205–215° C. is obtained from the etheral solution by distillation in vacuo. The compound crystallizes easily upon standing, melting point 51–53° C. The hydrochloride has melting point 193–195° C.

Example 3

Proceeding as in Example 2 but substituting the symmetrical ester, bis(3-dimethylaminopropyl)carbonate (116 g.) for the mixed ester used above, one obtains 2-chloro-10-(3'-dimethylaminopropyl)phenothiazine (60 g.).

Example 4

A mixture of phenothiazine (20.0 g.) and potassium acetate (3 g.) is heated in a distillation flask immersed in an oil bath at 200° C. The mixed ester (20.0 g.) of 2-dimethylamino-1-ethanol and ethanol with carbonic acid is added dropwise in the course of two hours, the distillate being collected. The resulting reaction mixture is kept at 200° C. for another 30 minutes, finally under vacuum (15 mm.) until distillation ceases.

The residue is worked up according to the procedure given in Example 2. 10-(2'-dimethylaminoethyl)-phenothiazine (22 g.), boiling point (1.5 mm.) 190–197° C., is obtained by fractionation in vacuo. The hydrochloride, recrystallized from ethyl acetate, melts at 225° C.

Example 5

Proceeding as in Example 2 but using the mixed ester (115 g.) of 3-(4'-methyl-1'-piperazinyl)-1-propanol and ethanol with carbonic acid, one obtains 2-chloro-10-[3'-(4" - methyl-1"-piperazinyl)propyl]phenothiazine (71 g.), boiling point (0.05 mm.) 198–204° C. The dimaleate has melting point 203–204° C.

Example 6

A mixture of 2-ethylphenothiazine (7.0 g.) and potassium carobnate (0.5 g.) is placed in a distillation flask immersed in an oil bath. The reaction with the mixed ester (7.0 g.) of 3-dimethylamino-1-propanol and ethanol with carbonic acid is performed at 200–220° C. The reaction mixture is worked up in the usual manner. 10-(3'-dimethylamino - 1' - propyl)-2-ethylphenothiazine distills in vacuo (1.8 mm.) at 206–212° C. The yield is 8.6 g. The hydrogen oxalate, recrystallized from acetone, has melting point 156° C.

Example 7

By a procedure similar to that of Example 6, using 2-acetylphenothiazine (7.2 g.), potassium carbonate (0.5 g.) and the mixed ester (7.0 g.) of 3-dimethylamino-1-propanol and ethanol with carbonic acid there is obtained 10 - (3' - dimethylamino-1'-propyl)-2-acetyl phenothiazine (8.2 g.), boiling point (0.5 mm.) 226–234° C. The hydrogen maleate, recrystallized from ethylacetate-ethanol, had melting point 135–136° C.

Example 8

A mixture of 2-trifluoromethylphenothiazine (6.0 g.) and potassium carbonate (0.5 g.) is heated in the usual manner and reacted at 200–220° C. with the mixed ester (14.0 g.) of 3-(4'-methyl-1'-piperazinyl)-1-propanol and ethanol with carbonic acid. 2-trifluoroacetyl(10-[3'-(4"-methyl-1"-piperazinyl)propyl]phenothiazine (6.8 g.) distills at 215–219 C. (1 mm.). The di(hydrogen maleate), crystallized from ethanolether, has melting point 193–194° C.

Example 9

A mixture of phenothiazine (10 g.) and potassium carbonate (1.5 g.) is heated to 170–180° C. The mixed ester (30 g.) of 2-(N-morpholinyl)-ethanol and ethanol with carbonic acid is added dropwise. The reaction mixture is kept at 180° C. for another 30 minutes, finally under vacuum until distillation ceases.

The residue is extracted with toluene. Addition of a saturated solution of oxalic acid in ethanol precipitates the hydrogen oxalate of 10-[2'-(N-morpholinyl)-ethyl]-phenothiazine (17 g.). The salt, recrystallized acetone, has a melting point of 194–195° C.

Example 10

By a similar procedure to that of Example 6, employing 2-methylthiophenothiazine (12.3 g.), potassium carbonate (2.5 g.) and the mixed ester (25.0 g.) of 2-(N-piperidyl)-ethanol and ethanol with carbonic acid, there is obtained 10 - [2' - (N - piperidyl)-ethyl]-2-methylthiophenothiazine as the hydrochloride (14.9 g.), which is sparingly soluble in water. The hydrochloride, recrystallized from acetone, has a melting point of 212–214° C.

Example 11

Proceeding as in Example 6, but commencing with 2-methoxyphenothiazine (5.8 g.), potassium carbonate (1.0 g.) and the mixed ester (12.5 g.) of 3-(N-pyrrolidyl)-1-propanol and ethanol with carbonic acid, one obtains 10 - [3' - (N - pyrrolidyl)-1'-propyl]-2-methoxyphenothiazine (4.4 g.), boiling at 205–207° C. (0.1 mm.). The hydrochloride has a melting point of 142–144° C.

Example 12

Phenothiazine (8 g.) and potassium acetate (0.5 g.) reacts in the usual manner with the mixed ester (11 g.) of 3-dimethylamino-2-methylpropanol and ethanol with carbonic acid at 160° C. The reaction mixture is worked up as described in the examples above. Distillation in vacuo (1.5 mm.) yields 10-(3'-dimethylamino-2'-methyl-1'-propyl)-phenothiazine (9 g.) with boiling point 195–200° C.

The hydrogen maleate, recrystallized from ethylacetate, has melting point 187° C.

Example 13

Similarly, the reaction between phenothiazine (6 g.) and the mixed ester (8.4 g.) of 2-dimethylamino-1-propanol and ethanol with carbonic acid in the presence of potassium carbonate (0.3 g.) at 190° C. yields a mixture (7.5 g.) of the isomeric compounds 10-(2'-dimethylamino-1'-methyl-1'-ethyl)-phenothiazine and 10-(2'-dimethylamino-1'-propyl)-phenothiazine. The boiling point of the mixture is 190–195° C. (1.8 mm.).

Example 14

A 250 ml. distillation flask is charged with 2-chloro phenothiazine (23.5 g.), 3 - dimethylamino - 1 - propanol (22.0 g.) and anhydrous potassium carbonate (1.35 g.). The mixture is heated to 125° C. while stirring. In the course of 6 hours, diethyl carbonate (60.0 g.) is added dropwise, the flask being kept under vacuum which is increased from 500 mm. to 370 mm. at the end of the reaction period. The temperature is kept at 125–130° C.

Following the addition of diethylcarbonate, the flask is kept under atmospheric pressure at 200° C. for one hour, whereafter excess ester is distilled off in vacuo (14 mm.).

The residue is cooled and worked up as follows:

Water (100 ml.) is added and the aqueous phase is extracted with ether. The etheral extract is treated with dilute hydrochloric acid. The acid solution is basified with sodium hydroxide, extracted with ether and the ether evaporated.

The residue is distilled in vacuo (1 mm.) thus affording pure 2-chloro-10 - (3' - dimethylaminopropyl)phenothiazine (27 g.) with boiling point 201–205° C. The base melts at 56–58° C. The melting point of the hydrochloride is 192–194° C.

Example 15

The procedure is analogous to that of Example 14 above. A mixture of 2-chlorophenothiazine (23 g.), 2-dimethylaminoethanol (20 g.) and potassium acetate (3 g.) is reacted at 130° C. with diethyl carbonate (42 g.). The hydrochloride of the base 10-(2'-dimethylaminoethyl)-2-chlorophenothiazine which is sparingly soluble in water, is recrystallized from chlorobenzene, yield: 20 g. The melting point is 253° C.

Example 16

By a process similar to that of Example 14, but using phenothiazine (19 g.) and 2-diethylaminoethanol (20 g.) in the presence of potassium carbonate (1 g.) and adding at 150° C. diethyl carbonate (50 g.), one obtains 10-(2'-diethylaminoethyl)-phenothiazine (19 g.) as a yellow oil with boiling point 200–205° C. (1 mm.). The hydrochloride of the base, recrystallized from ethyl acetate, has melting point 174–175° C.

Example 17

By the same procedure, but commencing with phenothiazine (40 g.), 3-dimethylamino-1-propanol (35 g.), potassium carbonate (2 g.) and adding diethylcarbonate (90 g.) while the temperature is raised gradually from 150° to 200° C., 10-(3'-dimethylamino-1'-propyl)-phenothiazine (42 g.) is obtained. The base distills at 165–172° C. in vacuo (0.2 mm.).

Example 18

Proceeding in the same manner as described in Example 17, but replacing phenothiazine with 2-methoxyphenothiazine, there is obtained 2-methoxy-10-(3'-dimethylaminopropyl)-phenothiazine, which in the form of the maleate melts at 140–141° C.

Example 19

Proceeding in the same manner as described in Example 17, but replacing phenothiazine with 2-methylthiophenothiazine, there is obtained 2-methylthio-10-(3'-dimethylaminopropyl)-phenothiazine, which in the form of the hydrochloride melts at 160° C.

Example 20

A mixture of 2-chlorophenothiazine (23 g.) and potassium acetate (3 g.) was heated to 220° C. A mixture of 3-dimethylamino-3,3-dimethyl-1-propanol (27 g.) and diethyl carbonate (47 g.) was added dropwise. The reaction mixture was worked up as described in Example 14 above. The base, 10-(3'-dimethylamino-3',3'-dimethyl-1'-propyl)2-chlorophenothiazine (27 g.) distills in vacuo (0.1 mm.) at 195–205° C. The melting point is 123° C.

I claim:

1. A process for the aminoalkylation of phenothiazine and a derivative thereof which comprises reacting by heating to a temperature within the range of 150° C. to 270° C. in the presence of a basic catalyst; selected from the group consisting of potassium carbonate, potassium acetate and potassium phthalate.

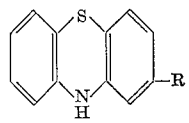

in which R is selected from the group consisting of hydrogen, chlorine, lower alkanoyl, and YR' in which Y is selected from the group consisting of oxygen and sulphur, and R' is alkyl of 1 to 6 carbon atoms, with a carbonic acid ester of the formula:

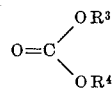

in which $R^3$ is represented by the formula

in which A is a primary alkylene having at least 2 carbon atoms in the principal chain and a total of up to 4 carbon atoms and in which the nitrogen atom is in one of the positions 2 and 3 of the alkylene chain,

is selected from the group consisting of di(lower alkyl) amino and N-lower alkylpiperazino, and $R^4$ is selected from the group consisting of

as hereinbefore defined and lower alkyl, whereafter the resultant product which is represented by the formula:

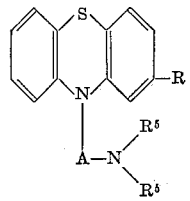

is obtained.

2. A process for the aminoalkylation of phenothiazine and a derivative thereof which comprises heating to a temperature within the range of 150° C. to 270° C. in the presence of a basic catalyst selected from the group consisting of potassium carbonate, potassium acetate and potassium phthalate a phenothiazine represented by the formula:

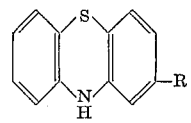

in which R is selected from the group consisting of hydrogen, chlorine, lower alkanoyl, and YR' in which Y is selected from the group consisting of oxygen and sulphur, and R' is alkyl of 1 to 6 carbon atoms, with a carbonic acid ester of the formula:

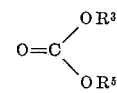

in which $R^3$ is represented by the formula

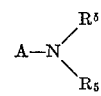

in which A is a primary alkylene having at least 2 carbon atoms in the principal chain and a total of up to 4 carbon atoms and in which the nitrogen atom is in one of the positions 2 and 3 of the alkylene chain,

is selected from the group consisting of di(lower alkyl) amino and N-lower alkylpiperazino, and $R^4$ is selected from the group consisting of

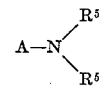

as hereinbefore defined and lower alkyl, said carbonic acid ester being added dropwise to said phenothiazine, whereafter the resultant product which is represented by the formula:

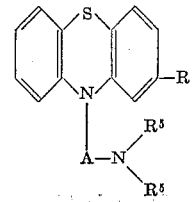

is obtained.

3. A process for the aminoalkylation of phenothiazine and a derivative thereof which comprises reacting by heating to a temperature within the range of 150° C. to 270° C. in the presence of a basic catalyst selected from the group consisting of potassium carbonate, potassium acetate and potassium phthalate a phenothiazine represented by the formula:

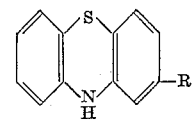

in which R is selected from the group consisting of hydrogen, chlorine, lower alkanoyl, and YR' in which Y is selected from the group consisting of oxygen and sulphur, and R' is alkyl of 1 to 6 carbon atoms, with a dialkylcarbonate and an aminoalcohol of the formula:

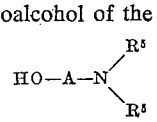

in which A is a primary alkylene having at least 2 carbon atoms in the principal chain and a total of up to 4 carbon atoms and in which the nitrogen atom is in one of the positions 2 and 3 of the alkylene chain,

is selected from the group consisting of di(lower alkyl) amino and N-lower alkylpiperazino, said phenothiazine, said aminoalcohol and said dialkylcarbonate being employed in a mole ratio of (0.8–1.2):(1.6–2.4):(3–5), whereafter the resultant product having the formula:

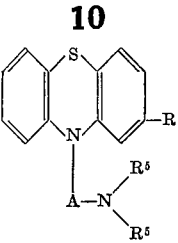

is obtained.

References Cited
FOREIGN PATENTS 620,485   1/1963   Belgium.

WALTER A. MODANCE, *Primary Examiner.*

H. I. MOATZ, *Assistant Examiner.*